Feb. 9, 1926.
W. H. TAYLOR
1,572,328
PLATFORM SCALE
Filed June 11, 1924　　2 Sheets-Sheet 2
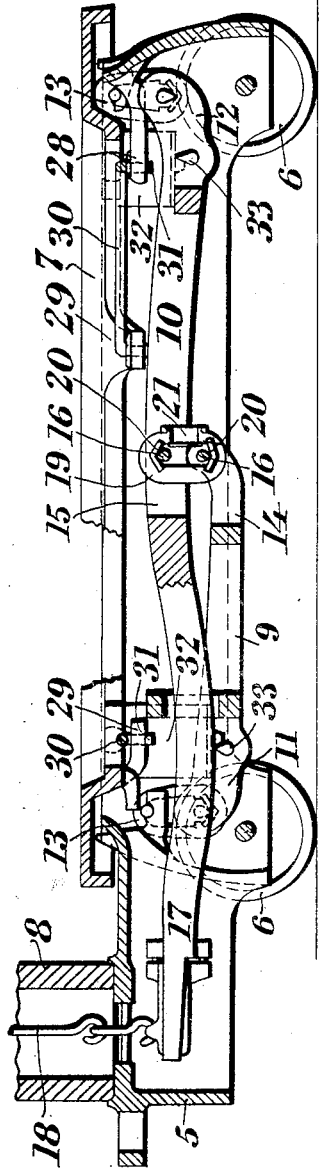
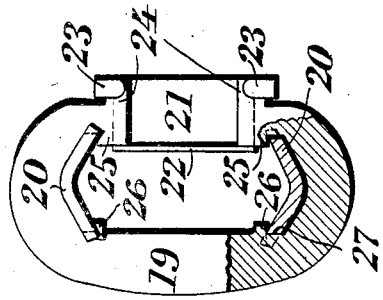
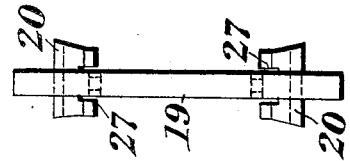
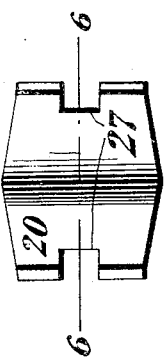
INVENTOR
*William H. Taylor,*
BY
*M. P. Bannett*
ATTORNEY Patented Feb. 9, 1926.

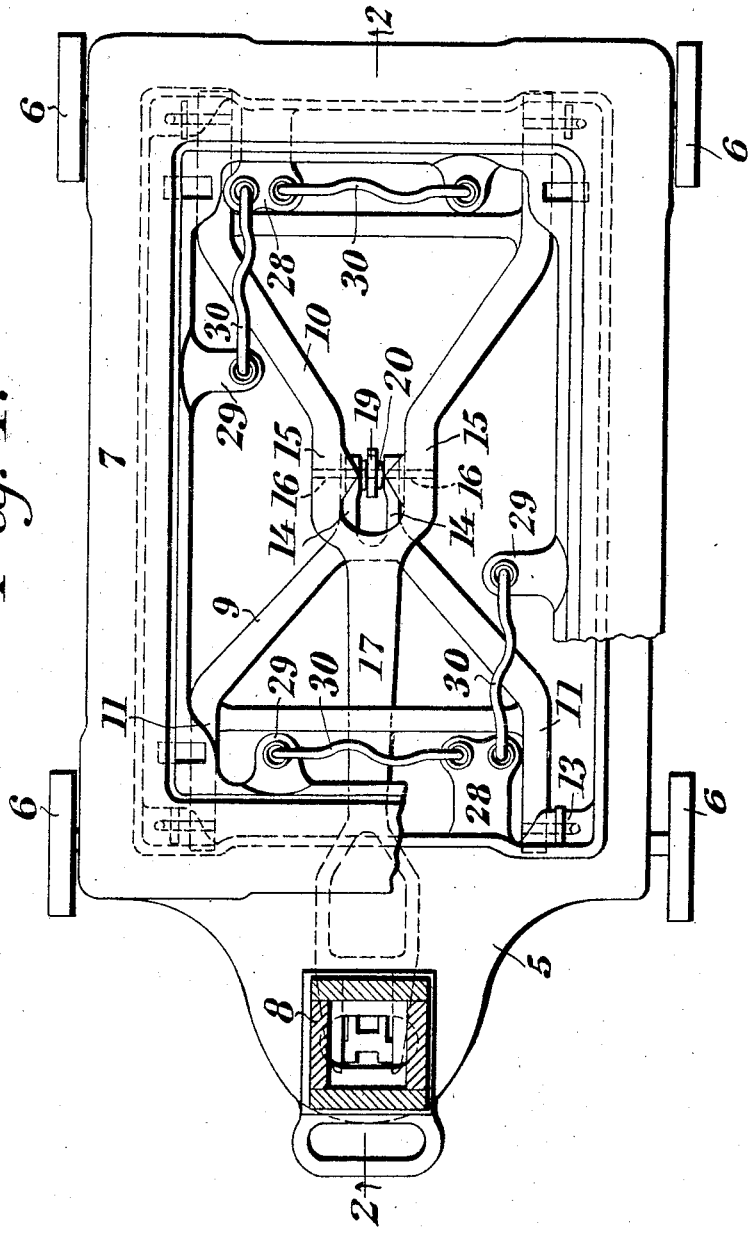

1,572,328

UNITED STATES PATENT OFFICE.

WILLIAM H. TAYLOR, OF ST. JOHNSBURY, VERMONT, ASSIGNOR TO E. & T. FAIRBANKS AND COMPANY, OF ST. JOHNSBURY, VERMONT, A CORPORATION OF VERMONT.

PLATFORM SCALE.

Application filed June 11, 1924. Serial No. 719,232.

*To all whom it may concern:*

Be it known that I, WILLIAM H. TAYLOR, a citizen of the United States, residing at St. Johnsbury, in the county of Caledonia and State of Vermont, have invented certain new and useful Improvements in Platform Scales, of which the following is a full, clear, and exact description, such as will enable others skilled in the art to which it appertains to make and use the same.

In an application for patent filed June 19, 1923, Serial No. 646,289, by Frank E. Church, there was shown and described a portable platform scale embodying several new features of construction, including the matter to be hereinafter shown and described as my invention.

This invention relates to improvements in weighing scales and more especially in some of its details to improvements in portable platform scales.

It is a general object of the invention to provide an improved scale of the class mentioned in which simplicity of construction, interchangeability of parts, ease of repair or replacement of parts, and economies in production cost are attained.

Another object of the invention is the provision of an improved scale in which refinement in construction is employed, resulting in enduring accuracy, and in which accuracy in operation is undisturbed by a slight disalignment of parts, either due to structural or assembling inaccuracies, or as a result of severe usage or accident.

Still another object is to provide an improved locking arrangement for sealing the center connection of the scale levers.

Another object is to improve and perfect the elements and assembly of elements in a scale, resulting in production and operating advantages.

Other objects will be in part obvious in connection with the following detailed description of an illustrative embodiment of the invention, and will be in part pointed out in connection therewith.

The invention accordingly comprises the features of construction, combination of elements, and arrangement of parts which will be exemplified in the construction hereinafter set forth, and the scope of the application of which will be indicated in the claims.

For a complete understanding of the nature and objects of the invention, reference is had to the following detailed description and to the accompanying drawings, wherein—

Figure 1 is a plan view of the platform of a portable platform scale constructed in accordance with the invention, parts being broken away for clearness of disclosure;

Fig. 2 is a longitudinal vertical section through Fig. 1, approximately on the line 2—2 thereof;

Fig. 3 is a detail enlarged view of the center loop or link, showing the improved locking plate and the compensating bearings;

Fig. 4 is an edge view thereof;

Fig. 5 is a plan of the V-shaped bearing plate; and

Fig. 6 is a section taken on line 6—6 of Fig. 5.

Referring now to the drawing for a detailed description of the embodiment of the invention there shown, the scale comprises a base frame 5, preferably provided with trucks 6, for rendering the scale easily portable. A load receiving platform 7 is supported to lie in a plane above the base frame member, and adjacent the forward end thereof is an upstanding column 8, for housing the load transmitting rod and other operating parts of the scale, and also for supporting the weigh-beam of the scale. As these latter parts do not form any part of the present invention, they are not illustrated in the accompanying drawings.

The main scale levers 9, 10, are mounted in the base frame member, being preferably of cast metal, and having longitudinally inclined side members and transverse connection members therefor. The side members at the outer ends thereof merge into parallel extensions 11, 12, to which the main or corner supporting bearings 13 are connected.

The main levers extend from the main bearings 13 toward each other, the sides converging, and the levers meeting near the center of the base frame member, where spaced parallel frame members 14 are provided in the lever 9, and similar opposed spaced parallel frame members 15 are provided in the lever 12. These spaced parallel members 14 and 15 provide opposed walls for the support of pivot bearings 16 for the center connection of the levers. The pivot bearings 16 are supported at both ends in the opposed walls, providing a secure and rigid support, and preventing bending or other displacement incident to severe usage or to other causes. The lever 10 is provided, beyond the center connection, with an extension 17, for transmitting the weighing stresses through the connected transmission rod 18, to the weigh-beam, as is understood in apparatus of this character.

By the present invention, the center connection or suspension for the main scale levers is preferably constructed in such a way as to permit it to be readily placed in position or removed and to be locked in position when the scale is sealed or adjusted for correct weighing. As shown in Figs. 1, 2, and 3 this connection preferably comprises a connecting link 19 having an opening for the reception of the self-compensating bearing plates 20 for pivotal engagement with the pivot pins 16, which are anchored in the levers 9 and 10 as above described.

The link 19 is provided with an open side forming a passageway to the interior opening, whereby the link is placed in operative position or removed. This passageway may be closed by a locking plate 21 preferably of sheet metal and having a marginal flange 22 forming a lug for engagement with the inner face of the link preventing outward movement of the plate and forming a contact surface against which the pivot pin 16 may strike, as when the levers are violently jarred. At its outer edge opposite the flange 22, the locking plate 21 is provided with projections 23 extending from the corners thereof and lying in position to be bent around the external lugs 24 which are disposed on the link 19 adjacent the passageway.

Similar inner lugs 25 are also provided on the link 19 for engagement with the flange 22 of the locking plate 21, these inner lugs also functioning to support the bearing plates 20 in position.

When the locking plate 21 is placed in position to span the passageway with the inner flange 22 in engagement with the lugs 25, the projections 23 lie adjacent the lugs 24, and may be bent around the latter by means of a special tool to secure the locking plate in position. This locking plate provides a simple but effective arrangement for closing the center link or loop in proper operative position and is easily placed in position when the scale has been assembled.

As particularly shown in Figs. 3, 4, 5, and 6, the improved self-compensating bearing construction includes a plate 20 substantially V-shaped in end elevation, forming an angular seat for the reception of the pivot pin 16, this plate preferably being of hardened steel. The bearing plate is seated in a correspondingly shaped seat formed in the supporting link, being secured in position by the lugs 25, at one side overlying the adjacent edge of the bearing plate, and at the other side by a lug 26 correspondingly overlying the edge of the bearing plate. The lug 26 is preferably integral with the link itself, being struck up therefrom after the bearing plate is placed in position. The bearing plate is slotted at the sides thereof, as indicated at 27, for the reception of the sides of the link adjacent the bearing seat so as to prevent the bearing plate from sliding longitudinally out of its seat. The slots 27 are wide enough so the edges thereof engage loosely with the sides of the link, and the retaining lugs 25, and 26 are spaced sufficiently above the edge of the bearing plate to permit freedom of rocking movement so the plate automatically adjusts itself to the proper position for contacting with the pivot pin.

In this manner the bearing is self-compensating and parts thereof will always be properly aligned irrespective of inaccuracies in the proportions of parts and assembly thereof, and this alignment will be retained irrespective of severe usage or wear. The seat of the bearing plate in the link being quite narrow, readily permits slight rocking movements of the bearing therein.

An inexpensive and convenient method of producing the bearing above described has been devised and being substantially as follows: Bars of steel of substantially the cross-sectional shape of the bearing, that is, in the embodiment shown substantially V-shaped, are provided and lengths are cut therefrom corresponding to the bearing length desired. These severed lengths are then punched at the lateral edges thereof to provide the slots 27, and the angular or V-shaped bearing surface may be smoothed or otherwise conditioned as by grinding. The plate as thus formed is placed in its supporting seat, as in the seat provided in the link 19, and the integral lug or lugs 26 then struck up from the adjacent metal of the supporting seat as by pinching together the metal at the opposite sides of the link or by punching with an appropriate tool.

An improved checking arrangement is also shown whereby the main scale levers and load receiving platform are held in properly centered position. This checking system preferably includes check lugs 28 at the opposite ends of the base frame, each having two spaced vertically disposed openings therein, these lugs preferably being formed integrally with the base frame. Similarly formed check lugs 29, preferably four in number, disposed on the four sides of the platform, are spaced from the lugs 28 having also vertically disposed openings therein, these lugs preferably being formed integrally with the base frame. The lugs 29 lie approximately in the same horizontal planes with the corresponding lugs 28. Check rods 30 are provided with angularly disposed projections 31 for reception in vertical openings of the check lugs. When the check rods are assembled with the spaced projections 31 seated in the corresponding check lugs, as shown in Fig. 1, the platform and main scale levers will be checked in correctly centered position in all directions.

For a complete understanding of the nature and objects of the above-described check-rods reference should be had to the application filed by Elmore E. Gognon, May 31, 1924, Serial No. 716,897 for improvements in check-rods for platform scales.

As will be seen in Fig. 2, the platform is supported by blocks 32 carried on knife edge bearings 33 on the main scale levers.

From the foregoing it will be seen that assembly or disassembly of the various elements is provided for and repair and replacement of parts facilitated.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In a scale, in combination, a base frame, scale levers suspended from said frame at spaced parts thereof extending toward each other, and each having spaced walls, a center connection for said levers, said center connection including pivotal bearings supported at opposite ends in said spaced walls and a connecting link having an opening therein and a passageway leading thereto, said link having bearing plates cooperating with said pivotal bearings, and a plate adapted to span said passageway and interlock with said link to lock it in position.

2. In a scale, in combination, a base frame, scale levers suspended from said frame at spaced parts thereof, extending toward each other, and each having spaced walls, a center connection for said levers, said center connection including pivotal bearings supported at opposite ends in said spaced walls, a connecting link having an opening therein, and a passageway leading thereto, lugs adjacent said opening, and a plate adapted to span said passageway and having projections for engagement with said lugs.

3. In a scale, in combination, a base frame, scale levers suspended from said frame at spaced parts thereof, extending toward each other, and each having spaced walls, a center connection for said levers, said center connection including pivotal bearings supported at opposite ends in said spaced walls, a connecting link having connection with said pivotal bearings, and having an opening therein and a passageway leading thereto, and a locking plate adapted to span said passageway and having an offset flange for engagement with the inner face of said link, and having a projection for engagement with said link.

4. In a scale, in combination, levers having spaced walls carrying pivotal bearings, and means for connecting said levers comprising a C-shaped link having loosely mounted plates in its top and bottom for engaging with said pivotal bearings.

5. In a scale, in combination, levers having spaced walls carrying pivotal bearings, means for connecting said levers comprising a C-shaped link having loosely mounted plates in its top and bottom for engaging with said pivotal bearings, and a plate adapted to interlock with said link to retain it in position.

In testimony whereof, I hereunto sign my name.

WILLIAM H. TAYLOR.